(12) United States Patent
Berinde et al.

(10) Patent No.: US 8,898,108 B2
(45) Date of Patent: Nov. 25, 2014

(54) SYSTEM AND METHOD FOR SCHEDULING DATA STORAGE REPLICATION OVER A NETWORK

(75) Inventors: Radu Berinde, Cambridge, MA (US); Matthew B. Amdur, Cambridge, MA (US); Christos Karamanolis, Los Gatos, CA (US)

(73) Assignee: VMware, Inc., Palo Alto, CA (US)

( * ) Notice: Subject to any disclaimer, the term of this patent is extended or adjusted under 35 U.S.C. 154(b) by 956 days.

(21) Appl. No.: 12/353,394

(22) Filed: Jan. 14, 2009

(65) Prior Publication Data

US 2010/0185583 A1 Jul. 22, 2010

(51) Int. Cl.
*G06F 17/30* (2006.01)
*G06F 11/14* (2006.01)
*G06F 11/34* (2006.01)

(52) U.S. Cl.
CPC ........ *G06F 11/1461* (2013.01); *G06F 11/1464* (2013.01); *G06F 11/3452* (2013.01)
USPC ......................................................... 707/610

(58) Field of Classification Search
USPC ......................................................... 707/610
See application file for complete search history.

(56) References Cited

U.S. PATENT DOCUMENTS

| | | | |
|---|---|---|---|
| 5,404,516 A * | 4/1995 | Georgiades et al. .......... | 718/104 |
| 7,080,105 B2 * | 7/2006 | Nakanishi et al. | |
| 7,340,646 B2 * | 3/2008 | Haustein et al. ................ | 714/20 |
| 7,606,844 B2 * | 10/2009 | Kottomtharayil | |
| 7,899,885 B2 * | 3/2011 | Aultman et al. ............... | 709/219 |
| 8,397,264 B2 * | 3/2013 | Ansari et al. ..................... | 725/74 |
| 8,495,037 B1 * | 7/2013 | Westenberg .................. | 707/698 |
| 8,661,220 B2 * | 2/2014 | Kono et al. .................... | 711/170 |
| 2003/0229653 A1 * | 12/2003 | Nakanishi et al. ............. | 707/200 |
| 2005/0021869 A1 * | 1/2005 | Aultman et al. ............... | 709/249 |
| 2006/0129562 A1 * | 6/2006 | Pulamarasetti et al. ........ | 707/10 |
| 2006/0171523 A1 * | 8/2006 | Greenwell ..................... | 379/242 |
| 2007/0088763 A1 * | 4/2007 | Yahalom et al. .............. | 707/201 |
| 2007/0283119 A1 * | 12/2007 | Sarkar et al. ................... | 711/170 |
| 2008/0154979 A1 * | 6/2008 | Saitoh et al. .................. | 707/202 |
| 2008/0263551 A1 * | 10/2008 | Ali et al. ........................ | 718/102 |
| 2009/0222496 A1 * | 9/2009 | Liu et al. ........................ | 707/204 |
| 2010/0205152 A1 * | 8/2010 | Ansari et al. .................. | 707/654 |

* cited by examiner

*Primary Examiner* — Robert Beausoliel, Jr.
*Assistant Examiner* — Noosha Arjomandi

(57) ABSTRACT

The replication of a group of data sets is coordinated into a single schedule based on the recovery point objective (RPO) of each data set. The resulting generated schedule satisfies each data set's RPO requirements and minimizes bandwidth use. If necessary bandwidth exceeds available bandwidth, the resulting generated schedule attempts to best satisfy each data set's RPO requirements given the available bandwidth.

20 Claims, 10 Drawing Sheets

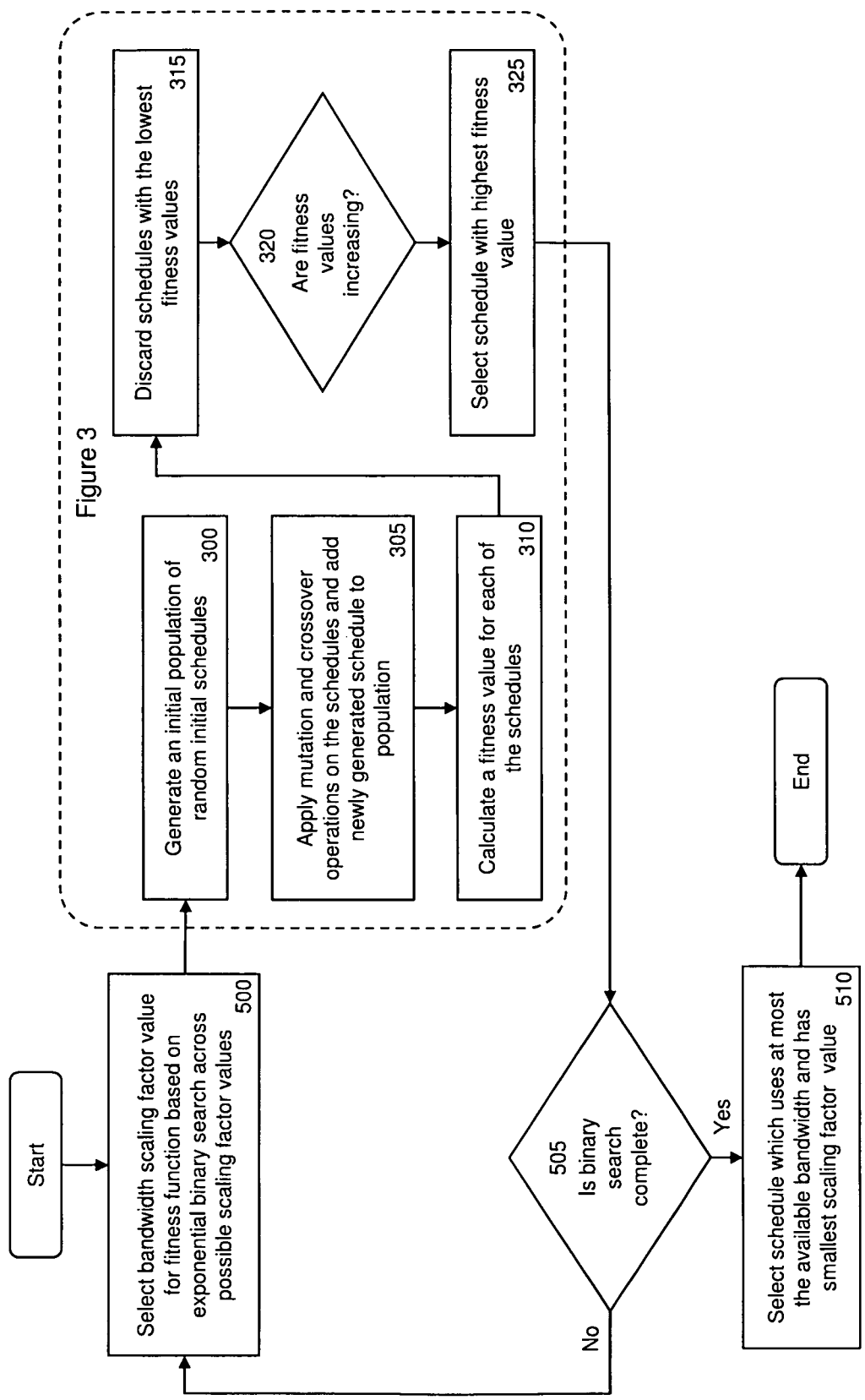

SYSTEM AND METHOD FOR SCHEDULING DATA STORAGE REPLICATION OVER A NETWORK

BACKGROUND

Storage replication is a data protection strategy in which data objects (e.g., files, physical volumes, logical volumes, file systems, etc.) are replicated to provide some measure of redundancy. Storage replication may be used for many purposes, such as ensuring data availability upon storage failures, site disasters, or planned maintenance. Storage replication also may be used for purposes other than ensuring data availability. For example, workloads may be directed to a replica of a data object rather than to the primary data object.

Often, storage replication methods are designed to support a constraint known as a recovery point objective (RPO) that typically specifies an upper limit on the potential data loss upon a failure or disaster. An RPO can be specified in terms of time, write operations, amount of data changed, and the like. For example, if an RPO for a certain set of data objects is specified as twenty-four hours, then a storage replication method designed to support this RPO would need to replicate such a set of data objects at least every twenty-four hours. This particular method replicates data object contents in such a way that the RPO for each data object is met.

In a typical storage replication scenario, there is one primary copy of the data object and one or more replicas of the data object. According to one storage replication method, contents of data objects are copied from the primary copy to a replica copy over some network interconnect. Certain implementations copy only portions of a data object that have been modified since the last time the data object was copied. The copying of the contents of one or more data objects is called a replication event. Replication events are typically repeated at scheduled points in time, so that the RPO for the corresponding data objects is satisfied. Scheduling replication events for different groups of data objects independently may result in poor utilization of network bandwidth, unpredictable times for the completion of the copy and failure to achieve the required RPO. Thus, it is desirable to schedule replication events in a way that satisfies the RPO requirements for all data objects while minimizing the total network bandwidth used over time. While intelligent scheduling of replication events may improve network bandwidth utilization, it may not be possible to satisfy the RPO for all data objects over time given the available network bandwidth. In those cases, it is desirable to schedule replication events in a manner that minimizes the impact and severity of RPO violations.

SUMMARY

One or more embodiments of the invention provide a protocol that schedules storage replication events so that the schedule satisfies specified Recovery Point Objectives (RPOs) while minimizing network bandwidth utilization over time, or minimizes the impact and severity of RPO violations within certain network bandwidth allotments.

In one or more embodiments of the invention, RPO requirements are specified for data sets and thus replication events are scheduled over time for data sets. As used herein, a data set refers to one or more data objects, wherein a data object may be any unit of stored data, such as a file, physical volume, logical volume, file system, disk, virtual machine disk, etc. A replication schedule is a finite sequence of replication events ordered by time. Within a schedule, each replication event represents a point in time in the future when the copy of the contents of the objects in a data set should commence. The copy may involve the entire contents of an object or only portions of the object. In the latter case, those are parts of a primary copy that have been modified since the last replication event for the said data set.

In one embodiment, a method for replicating a group of data sets is provided. The method comprises generating a plurality of schedules, wherein each schedule contains a list of replication times for each data set in the group and each data set has a recovery point objective (RPO) requirement and computational resources utilization estimation for said data set's replication. A fitness value is calculated for each of the schedules, wherein the fitness value is a function of a first metric capturing a penalty for violating the RPO requirements and a second metric capturing a penalty for the estimated utilization of said computational resources. The schedule with a best fitness value is selected and the group is replicated in accordance with the selected schedule.

As previous discussed, it may be desirable or necessary in certain situations not only to minimize computational resources utilization (e.g., such as bandwidth utilization), but to minimize the impact and severity of RPO violations within certain computation resource allotments (e.g., network bandwidth allotments). In such situations, the foregoing method may further comprise performing the generating, calculating and selecting steps for a plurality of scaling parameters that each weighs the relative importance between RPO requirements and computational resources utilization estimations. A best schedule is then identified by selecting a schedule generated using a smallest scaling factor from those selected schedules which do not exceed a predetermined bandwidth requirement, wherein the replicating step utilizes the identified best schedule to replicate the group.

BRIEF DESCRIPTION OF THE DRAWINGS

FIG. 5 depicts a flow chart of a process implemented by one or more embodiments of the present invention in order to generate a replication schedule that minimizes RPO penalty given a maximum available bandwidth.

DETAILED DESCRIPTION

Figure 1:
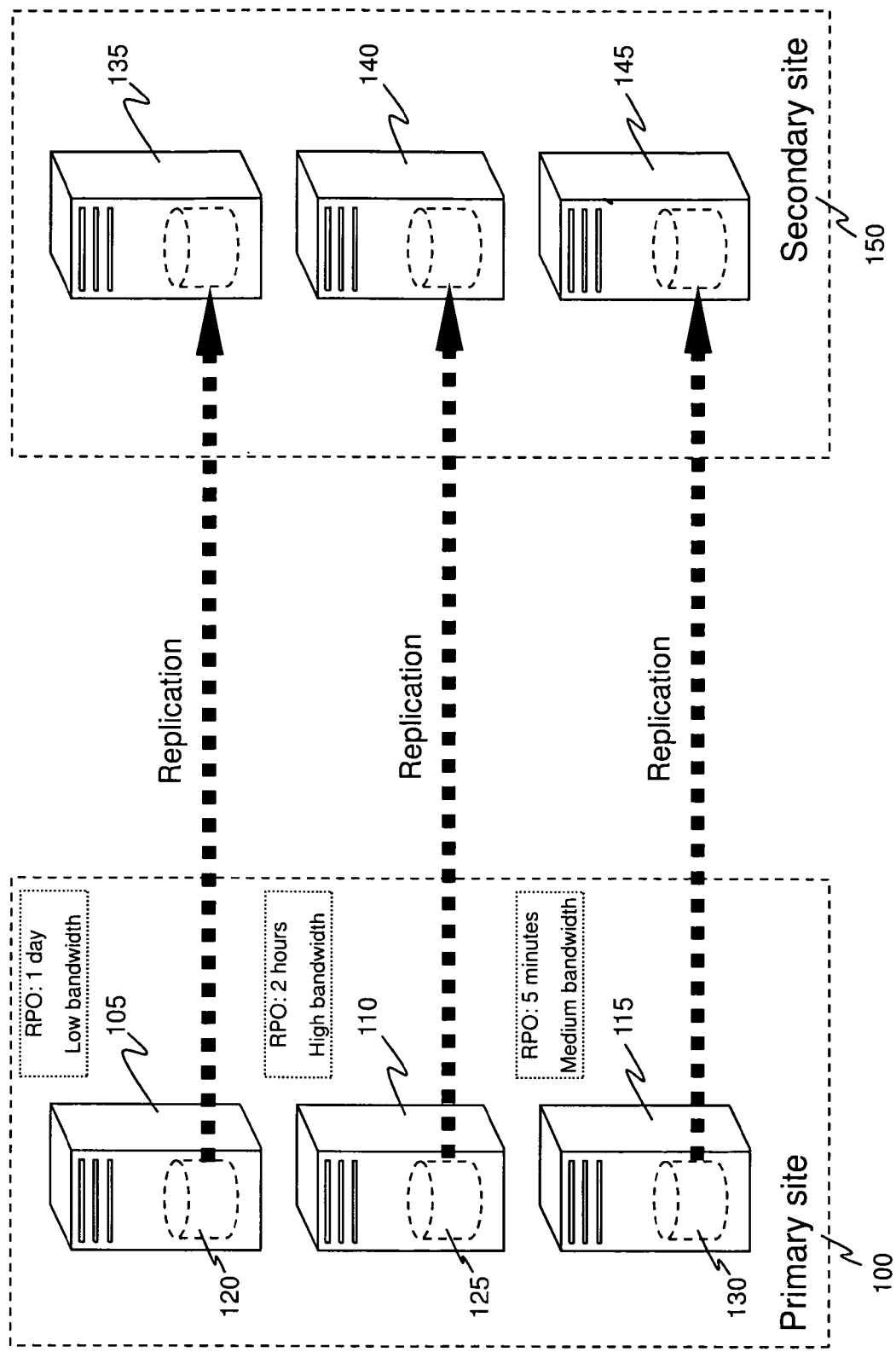
FIG. 1 depicts an environment in which one or more embodiments of the present invention may be implemented.

FIG. 1 depicts an environment in which one or more embodiments of the present invention may be implemented.

In primary site 100, computer systems 105 110 and 115 each contain a local hard drive 120, 125, and 130, respectively. It is desirable to replicate local hard drives 120, 125 and 130 to computers 135, 140 and 145, respectively, at secondary site 150. Each local hard drive 120, 125 and 130 may be thought of as a data set having one data object (namely, the drive itself). Each data set (i.e., each local hard drive in FIG. 1) has an associated RPO and bandwidth utilization estimation. Local hard drive 120 has an RPO of 1 day and low historical bandwidth utilization patterns, local hard drive 125 has an RPO of 2 hours and high historical bandwidth utilization patterns, and local hard drive 130 has an RPO of 5 minutes and medium historical bandwidth utilization patterns.

Each data set's past replication history is utilized to estimate the duration of an image transfer for the data set and the transfer bandwidth. Any known replication technique may be used in conjunction with embodiments of the present invention. In one embodiment, replication is performed by identifying and then copying the "dirty blocks" (parts of a primary copy that have been modified) from an immutable image of each primary data object in the data set to the corresponding replicate object. In such an embodiment, the duration of an image transfer is proportional to the amount of data that has been modified in the replication data set since the replication data set's last replication. Alternatively, each entire data object in a data set may be replicated rather than determining dirty blocks. In such an alternative embodiment, the duration of an image transfer is proportional to the size of the data set itself. In the embodiment of FIG. 1, transfer bandwidth may depend upon a variety of factors such as the speed of the disks, network interface, and disk utilization by the computer systems.

Figure 2:
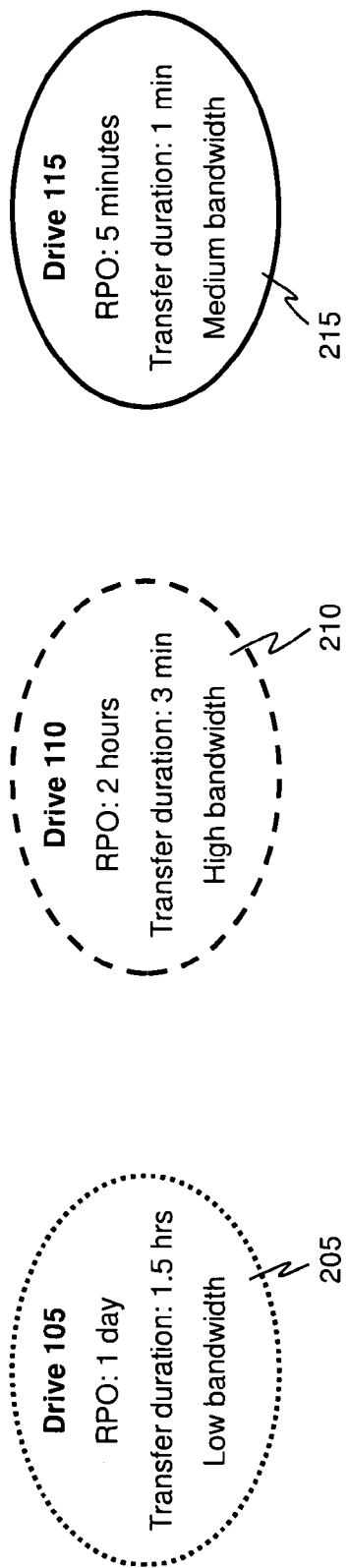
FIG. 2 depicts a visualization of a replication schedule for the data sets of FIG. 1.
Figure 2:
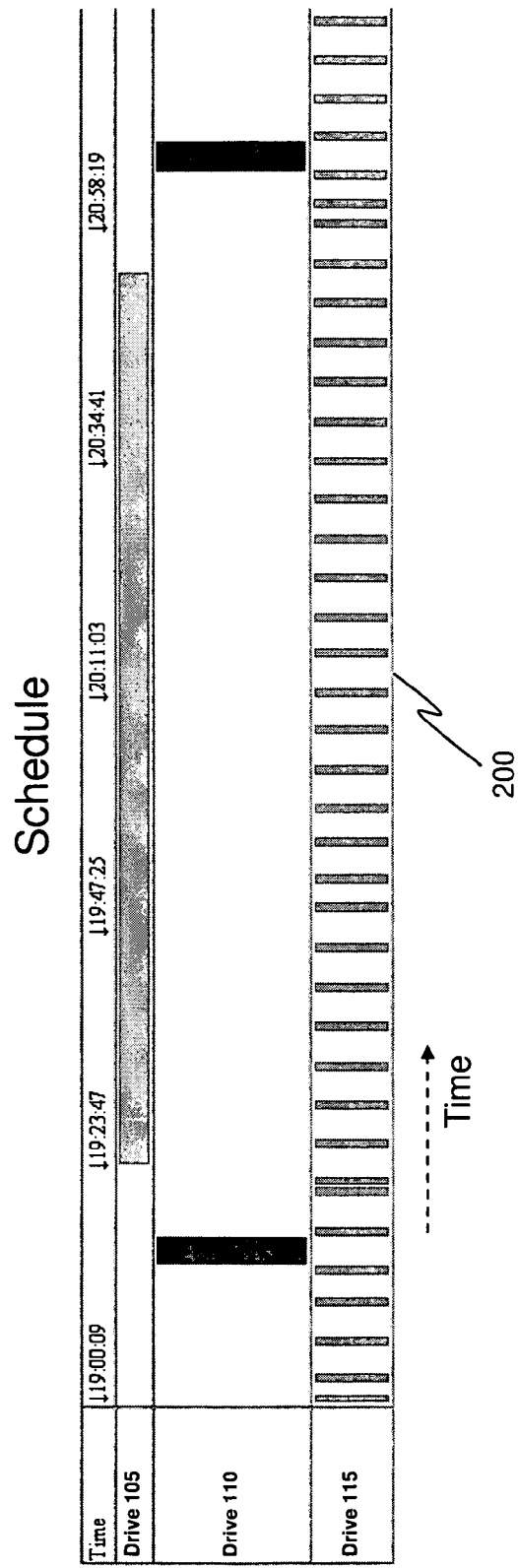

FIG. 2 is a visualization of a replication schedule 200 that satisfies each of the data sets' RPO requirements and minimizes the amount of bandwidth utilized at any particular point in time. The data replication characteristics of each data set 120, 125 and 130 are also depicted in FIG. 2, with local hard drive 120 having a transfer duration of 1.5 hours, local hard drive 125 having a transfer duration of 3 minutes, and local hard drive 130 having a transfer duration of 1 minute. FIG. 2 depicts replication schedule 200 with time as its horizontal axis and estimated bandwith consumption as its vertical axis. It should be recognized that a replication schedule can also be depicted in a variety of other visual and non-visual representations, including as a sequence or ordered list of replication times for a finite duration of time, wherein each replication time corresponds to one of the data sets in a group of data sets subject to replication.

Figure 3:
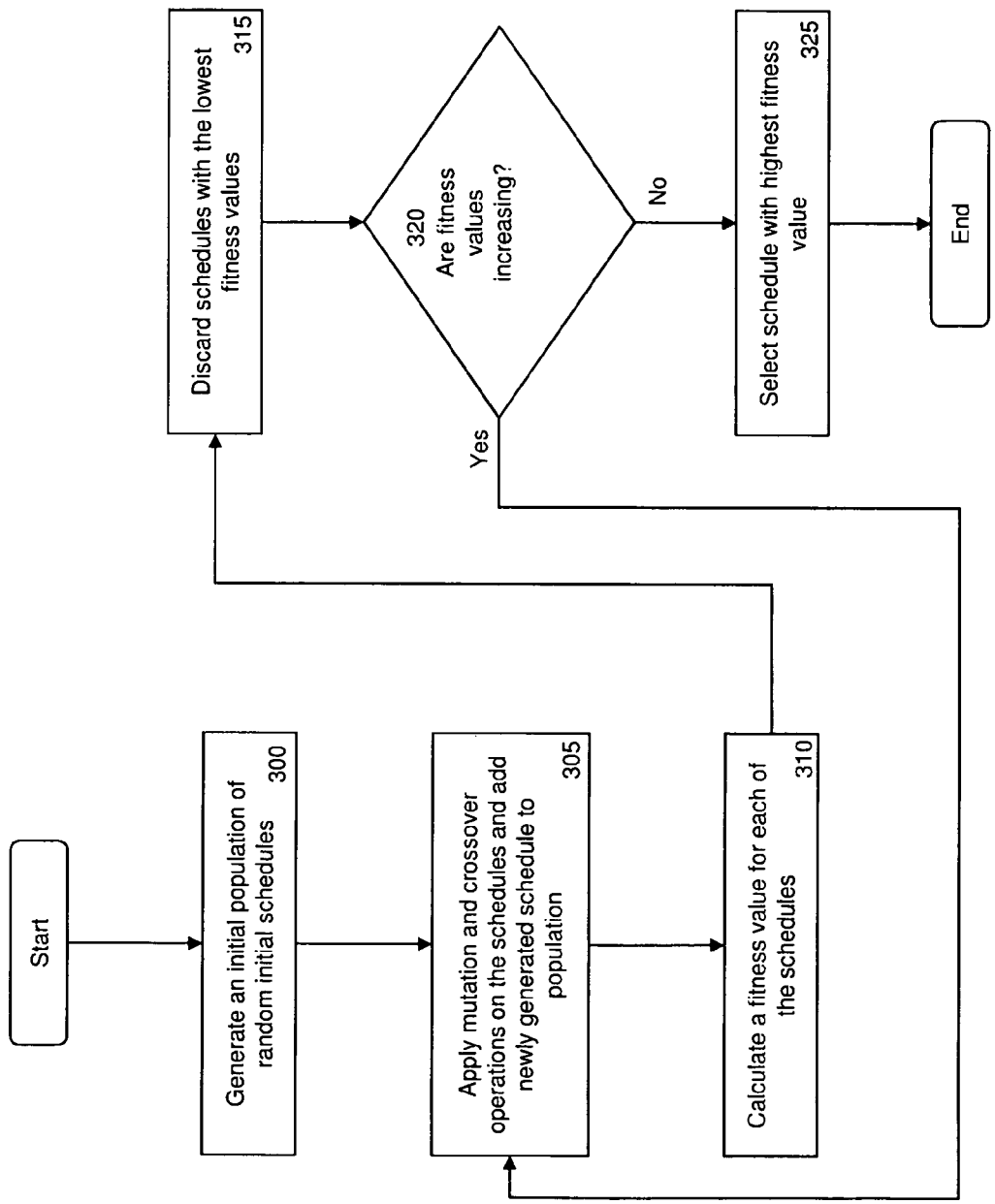
FIG. 3 depicts a flow chart of a process implemented by one or more embodiments of the present invention in order to generate a replication schedule that minimizes bandwidth utilization and satisfies each data set's RPO requirements.

FIG. 3 depicts a flow chart of a process implemented by one or more embodiments of the present invention in order to generate a replication schedule that minimizes bandwidth utilization and satisfies each data set's RPO requirements. In step 300, an inital population of replication schedules is randomly generated for a group of data sets. Because they are randomly generated, these schedules may or may not satisfy the RPO requirements of the data sets. Certain embodiments may apply initial rules to the random generation of schedules in step 300. For example, one embodiment may require that randomly generated schedules produce "disjointed" replication schedules for each data set, such that replications for two different data sets never overlap. In step 305, random perturbations are applied on the existing schedules to produce a new set of random schedules which are added to the population. In one embodiment, random perturbations include mutation operations and crossover operations, the details of which are provided further below. A "fitness value" is calculated for each of the schedules in the population in step 310. This fitness value, also further detailed below, serves as an indication of how well the schedule satisfies the RPO and bandwith requirements of each of the data sets in the schedule. In step 315, schedules with the lowest fitness value are discarded from the population. In step 320, the process assesses whether the fitness values of the new population are better than values of a prior population. If the fitness values are improving, the process returns to step 305. If the fitness values are not improving, the process selects the schedule with the highest fitness value in step 325 as its final schedule. In one embodiment, the assessment of step 320 is determined by identifying the schedule in the population with the highest fitness value and comparing the value to a previous highest fitness value of a population of a previous iteration. Such an embodiment may perform step 320 over the course of a number of iterations rather than at every iteration. For example, if the iteration is a multiple of 500, the best fitness value in the population is compared to the best fitness value in a prior population (i.e., the population from the previous iteration that was a multiple of 500) and if the relative increase is less than a pre-determined percentage, the flow proceeds to step 325. It should be recognized that any number of other techniques to determine whether fitness values are improving between iterations of the flow of FIG. 3 may be used in different embodiments. Furthermore, in alternative embodiments, improving fitness values may be indicated by a low values rather than highest values such that selecting a best fitness value in step 320 may correspond to selecting a lowest fitness value rather than a highest.

It should also be recognized that the selection or determination of certain variables in the foregoing process (e.g., initial number of schedules generated in step 300, number of mutations and crossover operations performed on the population in step 305, number of new schedules generated in step 305, number of low fitness schedules discarded in step 315, determination of whether fitness values are improving in step 320, etc.) may vary in different embodiments depending upon the number of data sets in the group, the length of the schedule desired and other characteristics of the particular environment in which an embodiment operates. In one embodiment, for example, if the initial population of schedules generated in step 300 is in the order of hundreds, the number of mutation operations performed in step 305 may be be a multiple of the initial population size and the number of crossover operations performed in step 305 may be a factor smaller than the initial population size. It should also be recognized that alternative steps in the flow of FIG. 3 may be implemented without departing from the spirit of the invention. For example, in one embodiment, rather than discarding schedules with the lowest fitness values from the population in step 315, schedules are randomly selected for removal using their associated fitness values as a probability distribution.

A mutation operation of step 305 performs a randomized change on a particular schedule to produce a new schedule. For example, a particular mutation operation may be selected from the following possibilities: (1) removing a random scheduled replication for a particular data set in the schedule; (2) scheduling a random replication for a particular data set in the schedule; (3) moving a random replication to a different point in time for a particular data set in the schedule; (4) aligning a random replication for a particular data set to the data set's next deadline (e.g., if the RPO is already satisfied by the replication, reschedule the replication as late as possible without violating the RPO, etc.); (5) aligning a random replication for a particular data set to a closest event in another randomly chosen data set (e.g., align the replication's start time with the finish time of a replication for the other data set or align the replication's finish time with the start time of a replication for the other data set); (6) removing a random time gap between replications for different data sets; and (7) removing all unnecessary replications (i.e., which if removed do not cause any new RPO violations). In certain embodiments, the number of and particular mutation operations to apply during step 305 may be determined randomly.

Figure 4:
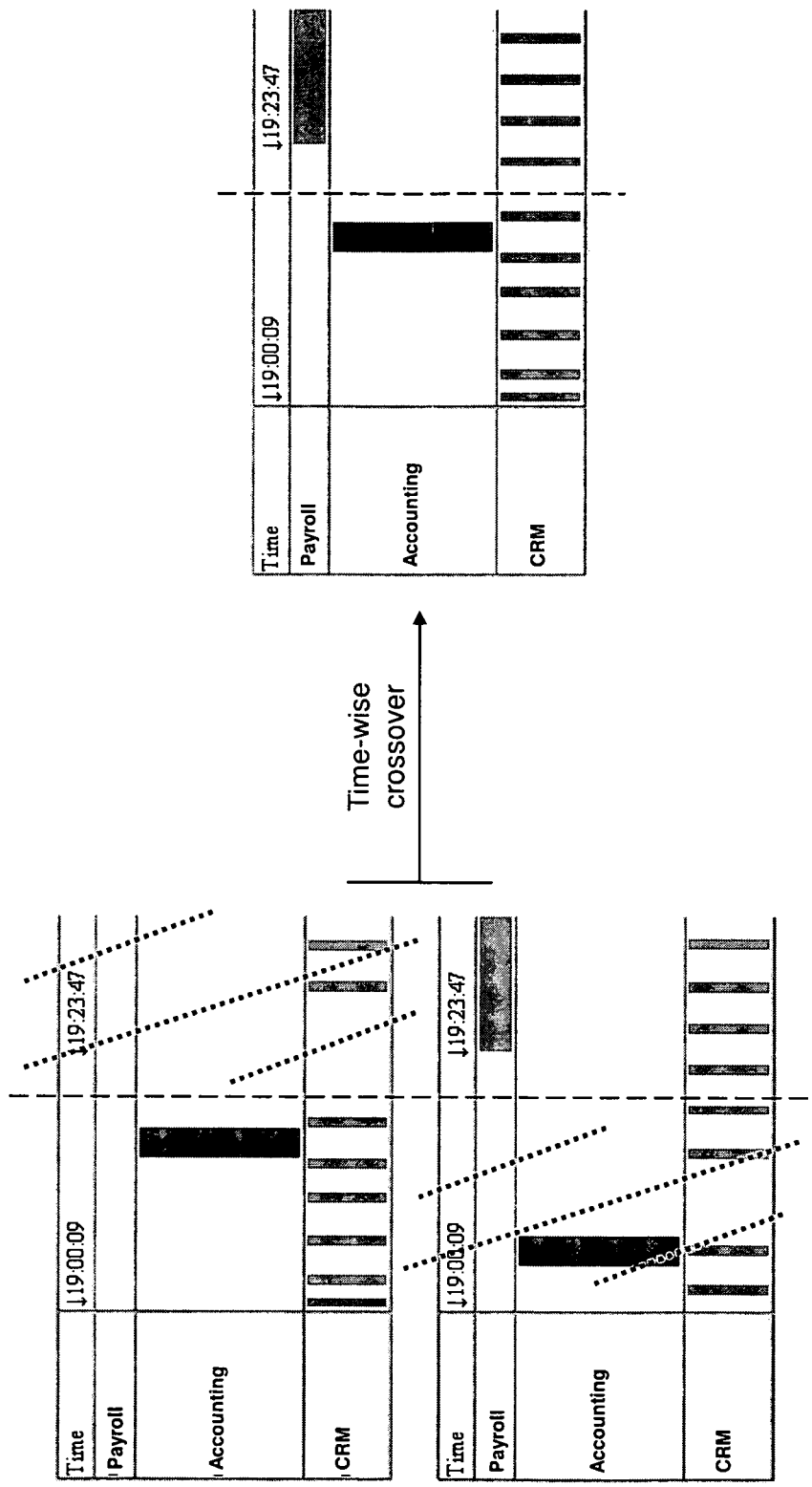
FIG. 4 depicts a visualization of random perturbation on a replication schedule, namely, a time-wise crossover.

A crossover operation of step 305 generates a new schedule as a random combination of two pre-existing schedules. In an "set-wise" crossover operation, the replication schedule for each data set is randomly taken from one of the two pre-existing schedules. In a "time-wise" crossover, the new schedule is created by choosing a random time, T, and taking all replications occuring before time T from the first pre-existing schedule and all replications occuring after time T from the second pre-existing schedule. FIG. 4 depicts a visualization of a time-wise crossover. It should be recognized that various other crossover operations may be devised and implemented consistent with the spirit of the invention. In one embodiment, the number of and particular crossover operations to apply during step 305 may be selected randomly, while in other embodiments, the selection of crossover operations may be biased towards one of the two types, such as the set-wise crossover.

The fitness value in step 310 is a function of two values which reflect how much the RPOs of the data sets in the schedule are violated and how much bandwidth is used. These two values are respectively referred to herein as (1) the RPO penalty, and (2) the bandwidth penalty. In one such embodiment, both the RPO and bandwidth penalty values are calculated using vector norms. Specifically, if x is an n-dimensional vector with components $x_1, x_2, \ldots, x_n$ then the ell-k norm is defined as:

$$|x|_k = (|x_1|^k + |x_2|^k + \ldots + |x_n|^k)^{1/k}$$

The ell-1 norm is the sum of the components (in absolute value). The ell-2 norm is the Euclidean length of the vector. The higher the norm, the more the value tends to be determined by the maximum element of the vector (in absolute value). As k goes to infinity (ell-infinity norm), the value becomes equal to the maximum value.

In an embodiment that utilizes the foregoing vector definitions, the value of the bandwidth penalty can be defined as the some norm of vector x (e.g., the ell-4 or ell-16 norm, etc.), where x is an n-dimensional vector, where n is the length of the timeframe in seconds, such that $x_i$ is the bandwidth utilization in the $i^{th}$ second. Selection of the k value for the norm involves a tradeoff: a higher norm represents maximum bandwidth utilization, but the process of FIG. 3 encourages a lower norm to achieve incremental improvements. Experiments have suggested that a good value is for k is 16. For realistic dimensions (i.e., timeframes up to tens of hours), the value of the ell-16 norm is at most twice as high as the maximum value (ell-infinity norm).

Similarly, the RPO penalty is computed as a sum of the per-data set penalties. For each data set, the intervals of time when the RPO requirement is not satisfied are computed. If the lengths of these intervals are represented as a vector, then the data set RPO penalty is equal to some norm of this vector. Similar to the bandwidth penalty, selection of the k value for the norm involves a tradeoff: a higher norm represents a maximum interval (i.e., how much the RPO has been extended), but the process of FIG. 3 encourages a lower norm to achieve incremental changes. Each data set can also be assigned a weight representing the relative significance of an RPO violation. For example, if a data set A has a RPO requirement of 10 minutes and a data set B has an RPO of 100 minutes, then extending data set A's RPO by 1 minute should be 10 times "more significant" than extending data set B's RPO by 1 minute. However, extending data set A's RPO by 1 minute also yields 10 times more freed bandwidth (since data set A is scheduled 10 times more often than data set B). In certain embodiments, experiments have suggested that using equal weights worked best in practice.

A fitness value in step 310 that utilizes the foregoing definitions of RPO penalty and bandwidth penalty is calculated as the inverse of the summation of the two penalty terms with a relative bandwidth scaling factor to weigh the importance of the bandwith penalty against the RPO penalty (i.e., penalty=rpoPenalty+bandwidthScale*bandwidthPenalty). To generate a replication schedule that (1) minimizes bandwidth utilization, and (2) satisfies each data set's RPO requirements (as in FIG. 2), the bandwidth scaling factor can be set to a small value to minimize the importance of bandwidth penalty. However, the minimal bandwith used by such a generated schedule may still exceed actual available bandwidth (or user-configured bandwidth bounds).

FIG. 5 depicts a flow chart of a process implemented by one or more embodiments of the present invention in order to generate a replication schedule that minimizes RPO penalty given a maximum available bandwidth. In step 500, a value for the bandwidth scaling factor is selected using an exponential binary search (as further detailed below). Once that scaling factor is selected, the process proceeds to the flow of FIG. 3 to select a schedule with the highest fitness value. In step 505, the process determines whether the binary search has been completed. If it has been completed, then in step 510, the process selects that schedule generated from the flow of FIG. 3 which uses at most the available bandwidth and utilized the smallest bandwidth scaling factor.

In one embodiment, the exponential binary search utilized in step 500 of FIG. 5 follows the psuedo-code below:

```
left initial scaling factor value = small value that minimizes importance of
bandwidth and emphasizes schedules that satisfies RPOs;
right initial scaling factor value = large value that values bandwidth highly
such that no replications for any data sets are generated in order to
conserve bandwidth;
for a given number of iterations (e.g., 10) or until the right/left ratio is
below a certain threshold (e.g., 1.02):
    mid = sqrt(left * right);
    run the algorithm with scaling factor = mid;
        if the returned schedule uses more than the available
        bandwidth: left = mid;
        otherwise: right = mid;
from all the schedules which use at most the available bandwidth
encountered in this search, return that which was ran with the smallest
scaling.
```

Figure 5A:
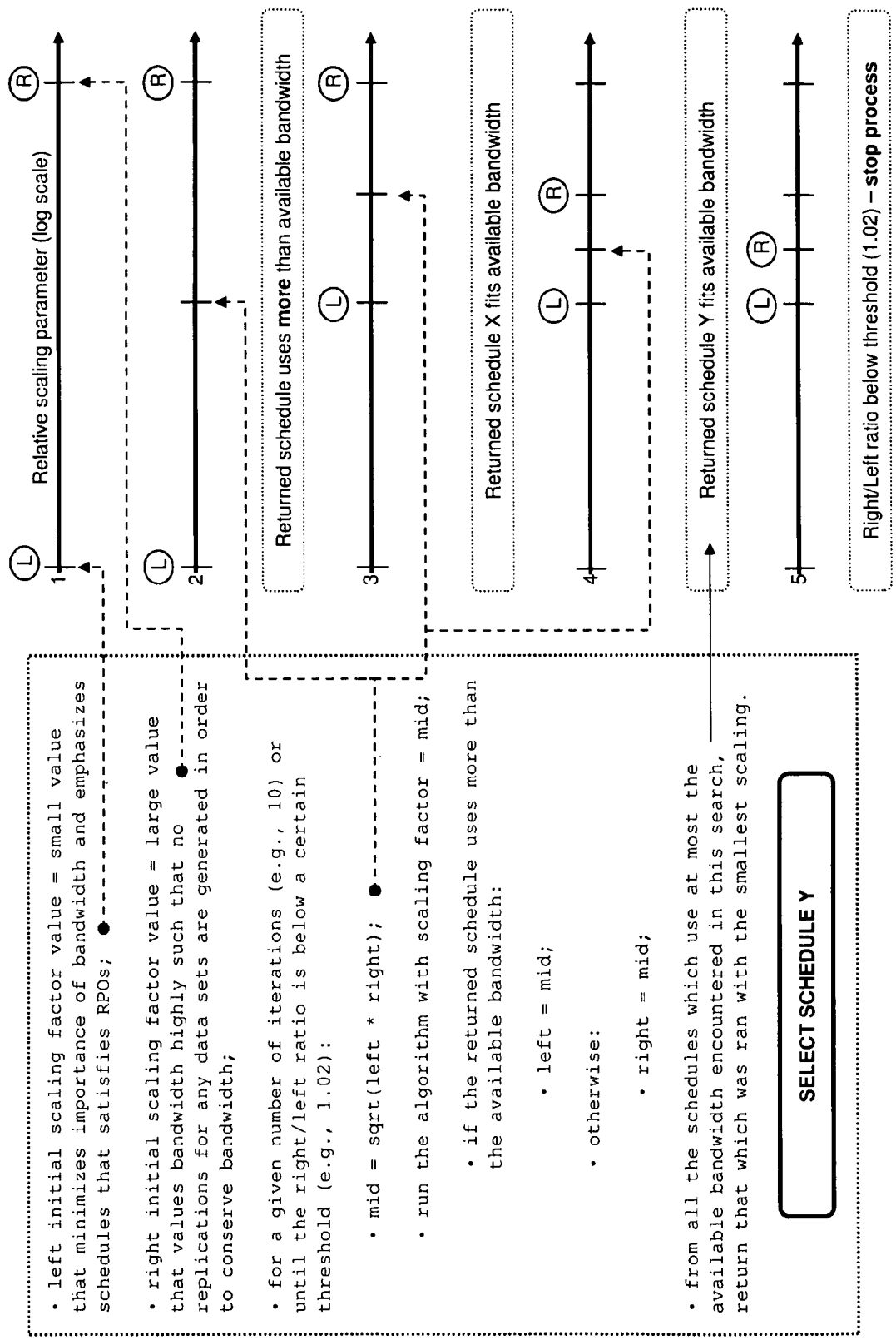
FIG. 5A depicts a visual representation of a binary search process in accordance with the flow of FIG. 5.

FIG. 5A is a visualization of the binary search above. It should be recognized that other searching techniques to determine the appropriate bandwidth scaling factor may be utilized in other embodiments, such as linear searching, etc.

Figure 6:
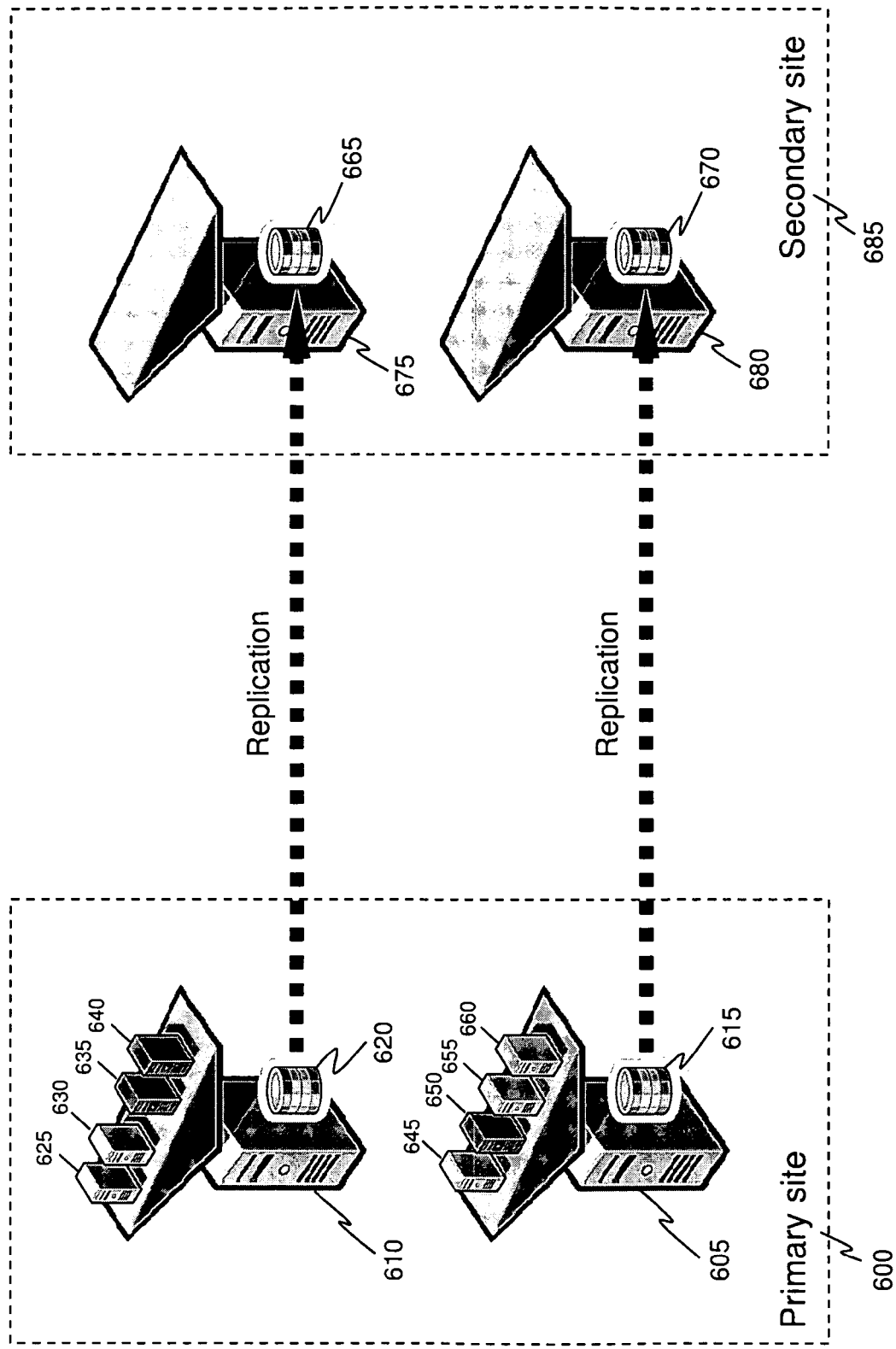
FIG. 6 depicts a virtual machine environment in which one or more embodiments of the present invention may be implemented.

While the embodiment of FIG. 1 depicted a simplified example in which each data set had one data object, it should be recognized that data sets may have more than one data object. FIG. 6 depicts one embodiment of a virtual machine environment where multiple data objects (i.e., virtual machines) make up each data set. In primary site 600, computer system 605 and 610 support an organization's business processes (e.g., payroll, accounting and CRM). In this example, each of computer system 605 and 610 has a hard drive, 615 and 620, respectively, and runs a set of virtual machines (625 to 660), each of which is allocated to one of the business processes. To back up primary site 600, these virtual machines 625 to 660 need to be replicated on hard drives 665 and 670 coupled to computer systems 675 and 680, respectively, in secondary site 685.

Figure 7:
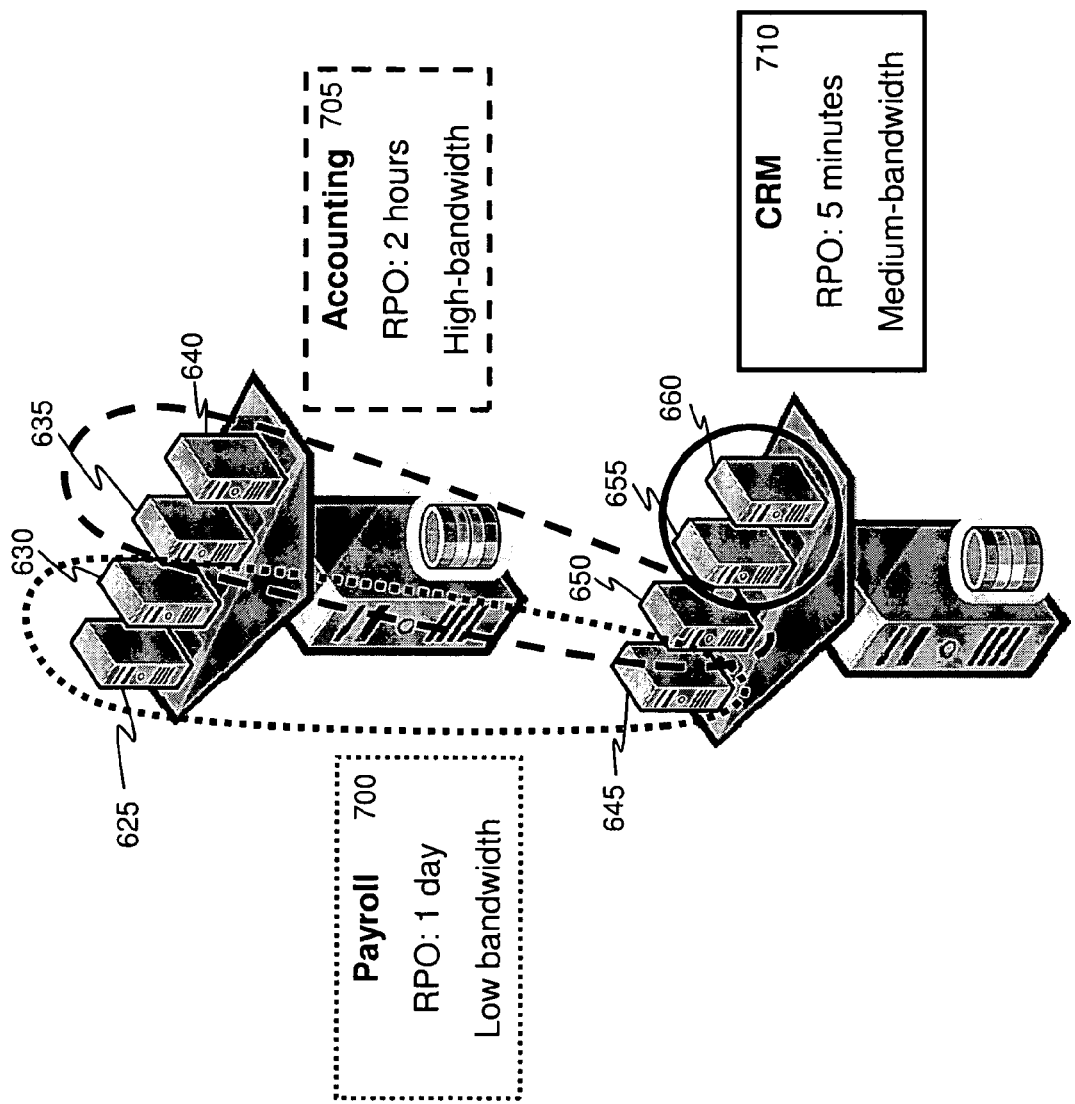
FIG. 7 depicts the various virtual machines in FIG. 6 grouped as data sets.
Figure 8:
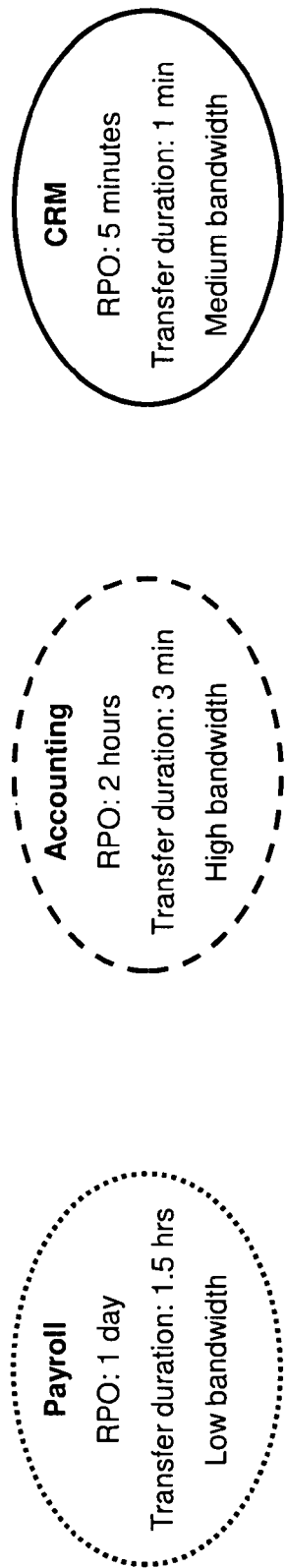
FIG. 8 depicts a visualization of a replication schedule for the data sets of FIG. 7.
Figure 8:
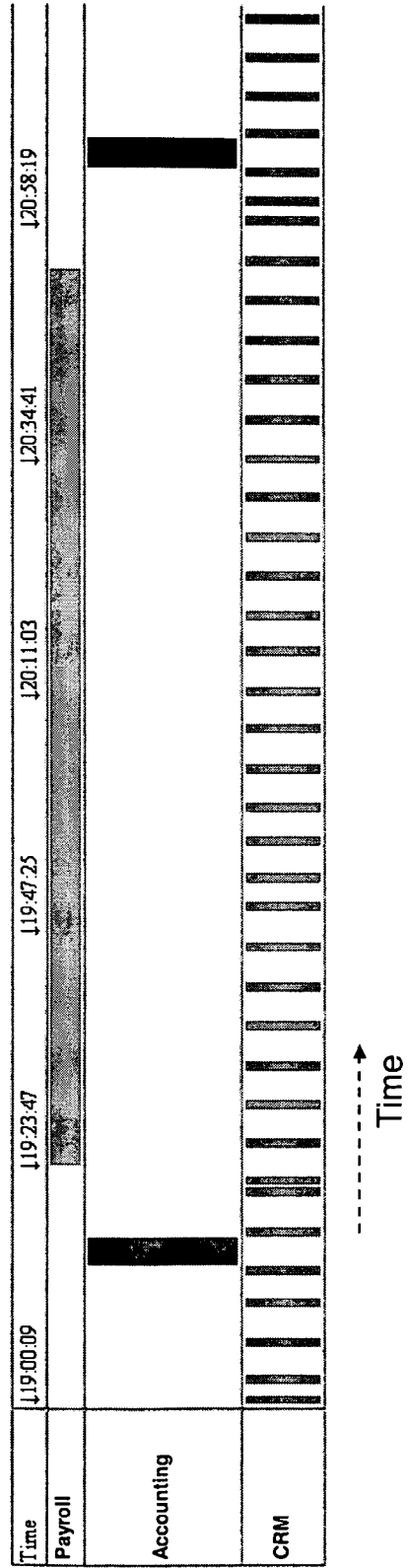

FIG. 7 depicts the various virtual machines in FIG. 6 as allocated to a particular business process, each having different RPO and bandwidth utilization estimations (i.e., each group of virtual machines allocated to a business process being a data set). For example, virtual machines 625, 630 and 645 implement the payroll function (data set 700), require an RPO of 1 day and have historically low bandwidth utilization patterns. Virtual machines 635, 640 and 650 implement the accounting function (data set 705), require an RPO of 2 hours and have historically high bandwidth utilization patterns. Virtual machines 655 and 660 implement the CRM function (data set 710), require an RPO of 5 minutes and have historically medium bandwidth utilization patterns. It should be recognized that the virtual machines as depicted in FIGS. 6 and 7 are merely illustrative of one type of data object upon which one or more embodiments of the present invention may be performed, and that any data set of data objects (e.g., files, hard drives, etc.), wherein the data sets have varied RPO and bandwidth estimations, may be replicated as taught herein. Similar to FIG. 2, FIG. 8 depicts a replication schedule for the embodiment of FIG. 7 that satisfies each of the data sets' RPO requirements and reduces the amount of bandwidth utilized at any particular point in time.

Figure 9:
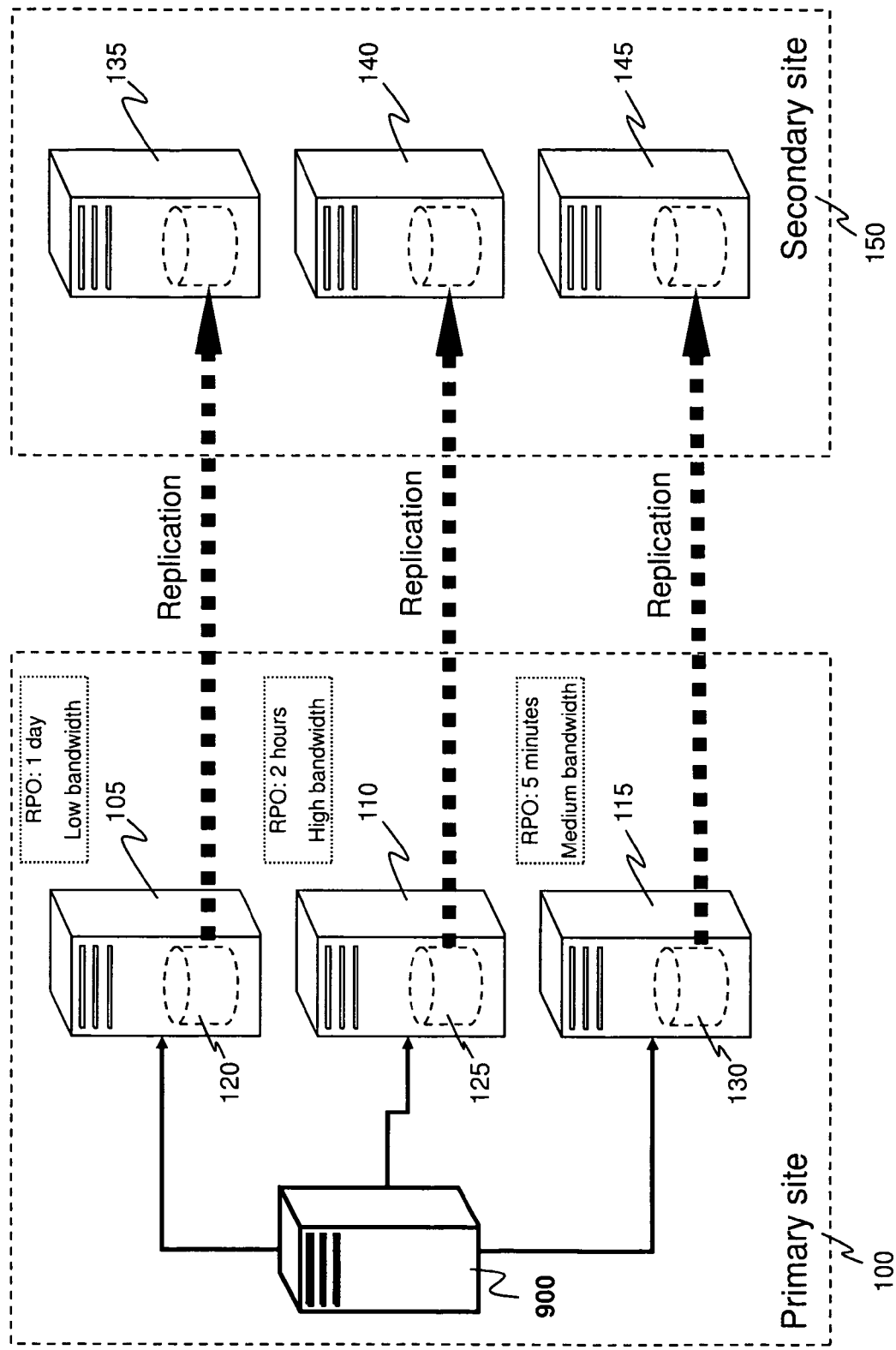
FIG. 9 depicts a computer system architecture in which one or more embodiments of the present invention may be implemented.

FIG. 9 depicts a computer system architecture in which one or more embodiments of the present invention may be implemented. Computer system 900 serves as a central management entity for the embodiment of FIG. 6. Computer system 900 is coupled to each of computer systems 105, 110 and 115 and coordinates the replication scheduling (as discussed in the context of FIGS. 3 and 5) for the various drives (i.e., local hard drives 120, 125 and 130). It should be recognized that other architectures can implement the processes discussed herein without departing from the spirit of the invention. For example, each computer system 105, 110 and 115 can also run its own management agent that coordinates the replication scheduling for data sets residing on such computer system. A similar scheduling agent can also reside in a disk array to schedule replication of data sets within the disk array. It should be recognized that a similar central management entity may also be implemented for the virtual machine embodiment of FIG. 7.

While examples in the foregoing detailed description have described generating a schedule that meets each data sets' RPO constraints and minimizes network bandwidth utilization over time (or otherwise minimizes the impact and severity of RPO violations within certain network bandwidth allotments, in the event available network bandwidth is limited), it should be recognized that alternative embodiments may have alternative goals of generating schedules to minimize (or otherwise optimize) other types of computational resources utilization against RPO constraints. Such other types of resources utilization may be, for example, CPU, memory or storage utilization. Metrics that may be used to measure resources utilization during data replication in order to calculate a fitness function depend upon the type of resource being minimized or optimized. For example, while the examples in the foregoing detailed description use a measurement of utilized bandwidth at a point in time during data replication as a metric to calculate a network bandwidth penalty for the fitness function, alternative embodiments minimizing the utilization of other types of resources during data replication may use metrics such as CPU cycles, utilized memory, or utilized storage bandwidth at a point in time to calculate respective CPU, memory or storage penalties for their respective fitness functions. Similarly, while the embodiments in the foregoing detailed description used a time metric to calculate an RPO penalty (i.e., time during with the RPO is not satisfied), it should be recognized that other alternative metrics, such as amount of data, may be used in an RPO penalty of a fitness function.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system. Computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless of the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

We claim:

1. A method for replicating a group of data sets, the method comprising:
    generating a plurality of schedules from which one schedule is to be selected for replication, wherein each schedule contains a list of replication times for each data set in the group and each data set has a recovery point objective (RPO) requirement and a utilization estimation of computational resources for said data set's replication;
    calculating a fitness value for each of the schedules, wherein the fitness value is a function of first and second values, the first value being a computed combination of an interval of time for each data set that the RPO requirement of the data set is not satisfied, and the second value being a computed combination of the estimated utilization of computational resources at points in time during a timeframe for replicating the group of data sets;
    selecting from the plurality of schedules, a schedule with a best fitness value among the fitness values of the schedules determined according to said calculating; and
    replicating the group in accordance with the selected schedule.

2. The method of claim 1,
    wherein the first value is a norm of a multi-component vector, each vector component corresponding to a data set in the group and having a value equal to an interval of time when the RPO requirement is not satisfied by the data set;
    wherein the second value is a norm of a multi-component vector, each vector component corresponding to a point in time during a timeframe for the replication of the group and having a value equal to the utilization of computation resources in an interval ending at the point in time; and
    wherein said utilization estimation of computation resources is a utilization estimation of a network bandwidth.

3. The method of claim 1, wherein the fitness value is further a function of a scaling parameter that weighs a relative importance between the first value and the second value.

4. The method of claim 3, further comprising the steps of:
    performing the generating, calculating and selecting steps for a plurality of scaling parameters; and
    identifying a best schedule by selecting a schedule generated using a smallest scaling factor from those selected schedules that do not exceed a predetermined bandwidth requirement, wherein the replicating step utilizes the identified best schedule to replicate the group.

5. The method of claim 4, wherein the plurality of scaling parameters is generated by running an exponential binary search across a set of possible scaling parameters.

6. The method of claim 1, wherein the generating step involves performing random perturbations on a current set of schedules.

7. The method of claim 6, wherein the random perturbations are selected from a group consisting of mutation operations and crossover operations.

8. The method of claim 1, wherein the generating step continues until fitness values corresponding to generated schedules do not increase by more than a predetermined percentage value.

9. The method of claim 1, wherein said fitness value is further a function of a weighting factor assigned to each data set in said schedule.

10. The method of claim 1, wherein the plurality of schedules from which one is to be selected as the schedule for replication are generated prior to said calculating, said selecting, and said replicating.

11. A computer system for replicating a group of data sets, the computer system comprising a processor programmed to:
    generate a plurality of schedules from which one schedule is to be selected for replication, wherein each schedule contains a list of replication times for each data set in the group and each data set has a recovery point objective (RPO) requirement and a utilization estimation of computational resources said data set's replication;
    calculate a fitness value for each of the schedules, wherein the fitness value is a function of first and second values, the first value being a computed combination of an interval of time for each data set that the RPO requirement of the data set is not satisfied, and the second value being a computed combination of the estimated utilization of computational resources at points in time during a timeframe for replicating the group of data sets; and
    select from the plurality of schedules, a schedule with a best fitness value among the calculated fitness values of the schedules.

12. The computer system of claim 11, further comprising a data store for replicating the data sets in accordance with the selected schedule.

13. The computer system of claim 11, wherein each data set includes at least one virtual machine image.

14. The computer system of claim 13, wherein the processor is further programmed to communicate with a plurality of computer systems, wherein each of the computer systems hosts a virtual machine platform and hosts at least one of the virtual machine images from at least one of the data sets.

15. The computer system of claim 11, wherein the processor is further programmed to communicate with a data store for replicating the data sets in accordance with the schedule.

16. The computer system of claim 11,
    wherein the first value is a norm of a multi-component vector, each vector component corresponding to a data set in the group and having a value equal to an interval of time when the RPO requirement is not satisfied by the data set;

wherein the second value is a norm of a multi-component vector, each vector component corresponding to a point in time during a timeframe for the replication of the group and having a value equal to the utilization of computation resources in an interval ending at the point in time; and wherein said utilization estimation of computation resources is a utilization estimation of a network bandwidth.

17. A non-transitory computer readable storage medium having stored therein a computer program for scheduling a group of data sets for replication, wherein a computer system executing the computer program carries out the steps of:

generating a plurality of schedules from which one schedule is to be selected for replication, wherein each schedule contains a list of replication times for each data set in the group and each data set has a recovery point objective (RPO) requirement and a utilization estimation of computational resources for said data set's replication;

calculating a fitness value for each of the schedules, wherein the fitness value is a function of first and second values, the first value being a computed combination of an interval of time for each data set that the RPO requirement of the data set is not satisfied, and the second value being a computed combination of the estimated utilization of computational resources at points in time during a timeframe for replicating the group of data sets; and selecting from the plurality of schedules, a schedule with a best fitness value among the fitness values of the schedules determined according to said calculating.

18. The computer readable storage medium of claim 17, wherein the computer system executing the computer program further carries out the step of communicating with a data store to replicate the data sets in accordance to the selected schedule.

19. The computer readable storage medium of claim 17, wherein the fitness value is further a function of a scaling parameter that weighs a relative importance between the first value and the second value.

20. The computer readable storage medium of claim 17, wherein the generating step involves performing random perturbations on a current set of schedules.

* * * * *